(12) United States Patent
Ebihara et al.

(10) Patent No.: US 6,905,752 B1
(45) Date of Patent: Jun. 14, 2005

(54) POLISHING TAPE USED IN PRODUCTION OF MAGNETIC RECORDING MEDIUM

(75) Inventors: Akira Ebihara, Osaka (JP); Shoichiro Noguchi, Kyoto (JP); Keiji Nakanishi, Sanda (JP)

(73) Assignees: Kanebo, Limited, Tokyo (JP); Kanebo Gohsen, Limited, Osaka (JP)

( * ) Notice: Subject to any disclaimer, the term of this patent is extended or adjusted under 35 U.S.C. 154(b) by 0 days.

(21) Appl. No.: 09/806,082

(22) PCT Filed: Sep. 30, 1999

(86) PCT No.: PCT/JP99/05434

§ 371 (c)(1),
(2), (4) Date: Aug. 20, 2001

(87) PCT Pub. No.: WO00/19419

PCT Pub. Date: Apr. 6, 2000

(30) Foreign Application Priority Data

Sep. 30, 1998 (JP) .......................................... 10-294609

(51) Int. Cl.$^7$ ........................... B32B 33/00; D03D 1/00; D03D 15/00

(52) U.S. Cl. ............................ 428/90; 428/92; 428/97; 428/903; 428/932; 442/189; 442/201

(58) Field of Search .............................. 428/90, 92, 97, 428/903, 932; 442/189, 201, 340, 351, 199, 202

(56) References Cited

U.S. PATENT DOCUMENTS 5,877,098 A * 3/1999 Tanaka et al. ............... 442/341
5,899,794 A * 5/1999 Shige et al. ................... 451/41
6,074,284 A * 6/2000 Tani et al. ..................... 451/57
2004/0162010 A1 * 8/2004 Ohno et al. .................... 451/41

FOREIGN PATENT DOCUMENTS

| JP | 06295432 A | * | 10/1994 | ............ G11B/5/84 |
| JP | 07244845 A | * | 9/1995 | ............ G11B/5/84 |
| JP | 08096355 A | * | 4/1996 | ............ G11B/5/84 |
| JP | 11114793 A | * | 4/1999 | ........... B24B/21/00 |
| JP | 11203667 A | * | 7/1999 | ............ G11B/5/84 |
| JP | 2000182237 A | * | 6/2000 | ............ G11B/5/84 |
| JP | 2001179588 A | * | 7/2001 | ........... B24B/21/00 |
| JP | 2001179594 A | * | 7/2001 | ........... B24B/29/00 |
| JP | 2001179595 A | * | 7/2001 | ........... B24B/29/00 |
| JP | 2002331465 A | * | 11/2002 | ........... B24D/11/00 |
| WO | WO 9910569 A1 | * | 3/1999 | ............. C25F/3/16 |

* cited by examiner

Primary Examiner—Cheryl Juska
(74) Attorney, Agent, or Firm—Flynn, Thiel, Boutell & Tanis, P.C.

(57) ABSTRACT

Disclosed is a tape for polishing the surface of a substrate of a magnetic recording medium, and a thin-fineness filament obtained by dissolving a dissolving component of a dissolution-decomposition type composite yarn consisting of a nylon component and the dissolving component is used as piles of a flocked cloth, warps of a fabric, and webs of a nonwoven fabric.

The polishing tape of the present invention can noticeably improve the surface roughness of the polished substrate.

2 Claims, 3 Drawing Sheets

POLISHING TAPE USED IN PRODUCTION OF MAGNETIC RECORDING MEDIUM

TECHNICAL FIELD

The present invention relates to a tape for polishing the surface of a substrate for a recording medium in the step of producing a magnetic recording medium.

BACKGROUND ART

As described in Examined Patent Publication (Kokoku) No. 7-13841 and Unexamined Patent Publication (Kokai) No. 8-96355, a magnetic recording medium obtained by subjecting a substrate made of an aluminum alloy to a non-magnetic plating treatment such as an alumite treatment, Ni—P plating or the like, coating with a primary layer of Cr, coating with a magnetic thin film layer of a Co-based alloy, and then coating with a carbonaceous protective film has hitherto been used exclusively as a magnetic recording medium.

Such a magnetic recording medium (magnetic disc) has a high dimensional accuracy and is liable to exhibit an enhanced recording density because of its hard substrate. When a magnetic head is contacted with a magnetic disk rotating at high speed, there arises a so-called head crushing to break down the magnetic head. To avoid head crushing, the magnetic head is employed in levitated state.

However, with the increase of the density of the magnetic disk, the levitation height of the head decreases more and more and levitation height of not more than 1.5 μm has recently been required. It is the greatest point for improvement in recording density to maintain the levitation height of the head at a very small value, and it is the greatest technical object to prevent head crushing while maintaining a low levitation height.

Studying about the magnetic disk, absorption sometimes arises between the levitated surface of the magnetic head and the magnetic disk when the disk is at a standstill in the case of writing on the magnetic disk or reproduction.

The adsorption phenomenon described above is caused by the fact that, when the levitated surface of the magnetic head and the surface of the magnetic disk are very smooth and mutually face a microspace, the microspace is filled with molecules such as $O_2$, $N_2$, $H_2O$, etc. and a large adsorptivity is caused by a surface tension. Such an adsorption phenomenon causes such a disadvantage that a large amount of electric power is consumed on the starting of a motor.

To prevent such an adsorption phenomenon, a substrate is textured, that is, the surface of the substrate is first mirror-finished and then the surface is adjusted to a proper surface roughness by roughening before forming a magnetic film on the substrate.

As the texturing method, the following method has hitherto been employed. For example, a so-called textured substrate can be obtained by directly transferring a Ni—P plated substrate in a radial direction of the substrate while pressing a polishing tape comprising deposited abrasive grains made of silicon carbide, alumina or diamond from the back surface of the tape by means of a roll in the state where the substrate is rotated, thus forming concentric streaks on the surface of the substrate.

However, it is considerably difficult to roughen the surface of the substrate by adjusting to a proper surface roughness using a conventional polishing tape, thus causing a problem that the surface of the substrate is too roughened.

To solve such a problem, Unexamined Patent Publication (Kokai) NO. 6-295432 has suggested that a constituent fiber of a polishing tape used for texturing is made thin as compared with a conventional one and the surface roughness Ra is adjusted to 40 Å or less by using a polishing tape composed of fibers having a diameter of 5 μm (fineness: 0.1 denier).

Also Unexamined Patent Publication (Kokai) No. 8-96355 has suggested a nonwoven fabric wherein a water retaining rate is not less than 400% and a fiber strength is not more than 11 (kg/5 cm width) in 10% modulus strength (longitudinal direction) when drying and, moreover, a difference between 10% modulus strength (longitudinal direction) when drying and that when wetting is not more than 8 (kg/5 cm width).

The respective polishing tapes described in the publications described above are provided with a characteristic constitution, thereby exerting a peculiar effect. According to a trend for several years ahead (five to six years), fixed abrasive grains have changed gradually into free abrasive grains in a polishing system, whereby a raised tape as a raw tape material has changed into a flocky tape and, moreover, a fabric and a nonwoven fabric as the other raw material has changed into a raw material with a more soft surface. Therefore, these polishing tapes are exclusively used at the present.

In a conventional polishing system, a tape using an abrasive having a large grain size and a fiber having a large single yarn fineness was satisfactorily employed. However, with the increase in the requirement of information density on the substrate, it has been required to develop a polishing tape using a microfiber having a small single yarn fineness, which can sufficiently retain an abrasive having a very small grain size.

In light of circumstances described above, the present invention has been made and an object thereof is to provide a novel polishing tape which has a polished substrate having a small surface roughness as compared with a conventionally suggested polishing tape and prevents the occurrence of crushing to the utmost, and is also capable of noticeably improving levitation characteristics of the magnetic head.

DISCLOSURE OF THE INVENTION

To attain the object described above, the present invention is provided with the following constitution. That is, the invention described in claim 1 is directed to a polishing tape for polishing the surface of a substrate of a magnetic recording medium, said polishing tape being made of a flocked cloth comprising a substrate and a flock material formed on said substrate, said flocked cloth having a tensile strength in a longitudinal direction as measured by the method A defined in JIS L 1096-1990 of not less than 25 kgf/50 mm and a tensile elongation of not more than 5%/5 kg/50 m, characterized in that a single yarn of a dissolution-decomposition type composite fiber consisting of a nylon component and a dissolving component is used as said flock material and a thin-fineness filament obtained by splitting said single yarn is used as a pile, and that said pile is formed in pile height within a range from 0.2 to 1.0 mm and pile density within a range from 100 to 200 g/m² and 80% or more of said pile is formed in fineness of less than 0.3 d.

The invention is also directed to a polishing tape for polishing the surface of a substrate of a magnetic recording medium, said polishing tape being made of a fabric, the sum total of a warp cover factor and a weft cover factor of said fabric being within a range from 2,000 to 4,500, characterized in that a multifilament made of nylon or polyester fibers having a single yarn fineness of not more than 5 d is used as a warp and a multifilament, whose constituent single yarn is formed into a dissolution-decomposition type composite fiber consisting of a nylon component and a dissolving component, is used as a weft, and that 80% or more of a thin-fineness filament obtained by splitting a single yarn of said dissolution-decomposition type composite fiber is formed in fineness of less than 0.3 d.

The invention is also directed to a polishing tape for polishing the surface of a substrate of a magnetic recording medium, said polishing tape being made of a nonwoven fabric, characterized in that a thin-fineness filament obtained by splitting a single yarn of a dissolution-decomposition type composite fiber consisting of a nylon component and a dissolving component is used as a web, and that 80% or more of said thin-fineness filament is formed in a fineness of less than 0.3 d and fiber length within a range from 20 to 120 mm.

BEST MODE FOR CARRYING OUT THE INVENTION

Figure 1:
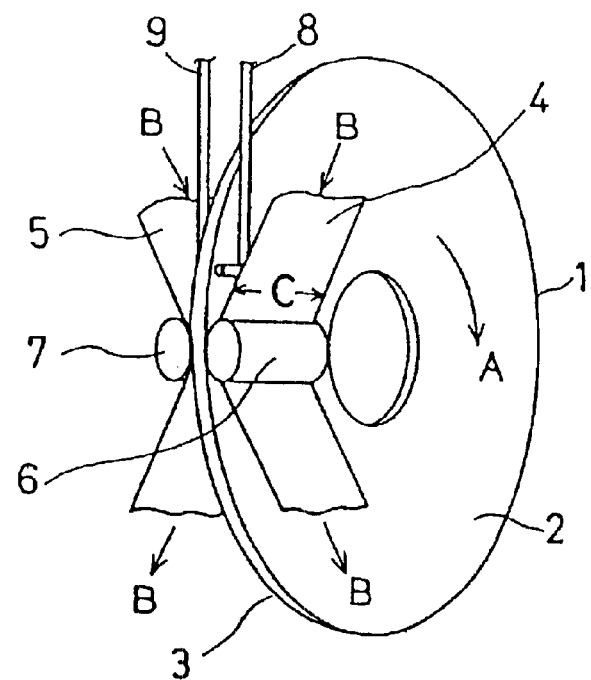
FIG. 1 is a perspective view showing the whole of the service condition of a polishing tape according to the present invention.

The embodiments of the present invention will be described below with reference to the accompanying drawings. First, the service condition of the tape of the present invention will be described by way of a texturing processing with reference to FIG. 1 and FIG. 2.

As shown in both drawings, each of two tapes 4, 5 travels in the direction indicated by the arrow B while pressing against each of the surface 2 and the back surface 3 of a substrate 1 rotating positively in the direction indicated by the arrow A by means of each of pressing rolls 6, 7 and, at the same time, an abrasive liquid containing free abrasive grains is continuously fed to surfaces to be polished of tapes 4, 5 from nozzles 8, 9, whereby slurry polishing is carried out.

The respective pressing rolls 6, 7 are driven by a cylinder 10 for pressurizing a roll, and press the respective tapes 4, 5 against the surface 2 and the back surface 3 at a predetermined pressure. Although the tapes 4, 5 continuously travel in the direction indicated by the arrow B, a new tape is always fed to both surfaces 2, 3 of the substrate 1 in the state of being contacted under pressure during traveling of the tapes, whereby the surface 2 and the back surface 3 are polished.

Also, the tapes 4, 5 reciprocate (vibrate) in the direction indicated by the arrow C by a reciprocating motion of the pressing rolls 6, 7 and streaks are formed on both surfaces of the substrate 1 by this movement and rotation of the substrate 1 itself, thereby forming the textured substrate 1.

Since the tape of the present invention is used while maintaining a fixed tensile elongation under a high tension, as described above, a raw material thereof is preferably a fiber structure capable of attaining a tensile strength in a longitudinal direction as measured by the method A defined in JIS L 1096-1990 of not less than 25 kgf/50 mm and a tensile elongation of not more than 5%/5 kg/50 m.

Specific textures of such a fiber structure are textures such as flocked cloth obtained by fixing predetermined piles on a substrate coated with an adhesive by means of high-pressure static electricity, conventional fabric of a stain, nonwoven fabric obtained by appropriately accumulating and fixing webs and the like.

Regarding the flocked cloth, fabric and nonwoven fabric, which constitute the tape of the present invention, a thin-fineness filament obtained by splitting a single yan of a dissolution-decomposition type composite yarn containing nylon 6 nylon 66 as a major constituent fiber is used and 80% or more of the thin-fineness filament is formed in a fineness of less than 0.3 d.

The thin-fineness filament can be obtained easily from a dissolution-decomposition type composite yarn with petal-shaped segments described in Examined Patent Publication (Kokoku) No. 6-21397, a dissolution-decomposition type composite yarn with sea-island type segments described in Examined Patent Publication (Kokoku) No. 62-50594 or the like by splitting a constituent single yarn.

Examined Patent Publication (Kokoku) No. 6-21397 discloses a dissolution-decomposition type composite yarn wherein a fiber forming polymer made of nylon 6 or nylon 66 is split into seven or more segments by a polymer having dissolution properties larger than those of the fiber-forming polymer and one of the segments is a core segment having a fineness of not less than 1.2 d arranged at almost the center of a transverse section of the fiber, while other segments are six or more petal-shaped filaments having a fineness of not more than 0.5 d arranged around the core segment. The thin-fineness filament used in the present invention can be obtained at a predetermined fineness and a predetermined proportion by forming a composite yarn having such a single yarn structure at a predetermined fineness and dissolving to remove a polymer having large dissolution properties before and after the knitting process.

Examined Patent Publication (Kokoku) No. 62-50594 describes a dissolution-composition type composite yarn (single yarn) consisting of a sea component polymer having large dissolution properties and decomposition properties to chemicals and an island component polymer wherein values of these physical properties are comparatively low. The other example of the thin-fineness filament used in the present invention can be obtained by forming the island component with nylon 6 or nylon 66 and completely dissolving only the sea component polymer without dissolving to remove the island component polymer.

In the present invention, the thin-fineness filament obtained by such a process is used as flock materials of the flocked cloth, warps of the fabric, and webs of the nonwoven fabric. Specific embodiments of the respective tapes made of the above materials will be described separately, though a predetermined fineness varies.

The polishing tape made of the flocked cloth can be produced by either a known continuous flocking apparatus of a DOWN system or a known continuous flocking apparatus of an UP system, but the continuous flocking apparatus of an UP system utilizing only a suction force of a high-pressure electrostatic field is superior in that piles as the flock material can be fixed more perpendicularly to the adherend surface on needle planting and a high-density product can be obtained. Therefore, it is suited for use in the polishing tape of the present invention.

Figure 3:
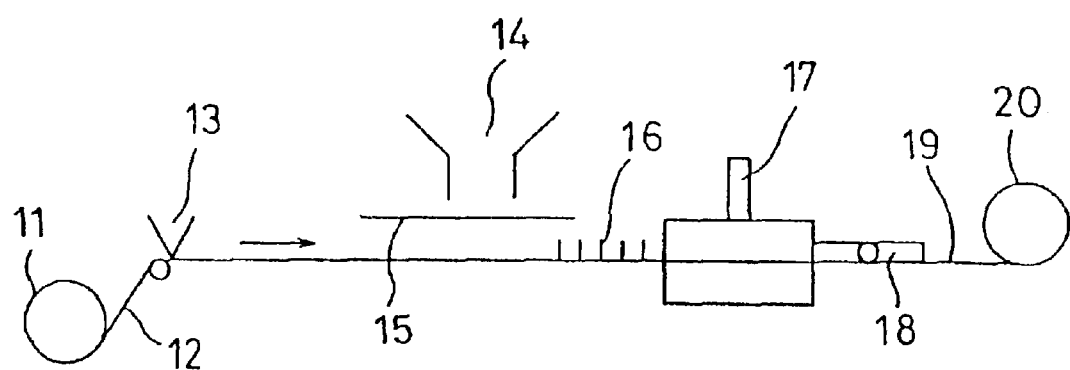
FIG. 3 shows a portion of the manufacturing process of a flocked cloth and is a view for explaining a flocking step.
Figure 4:
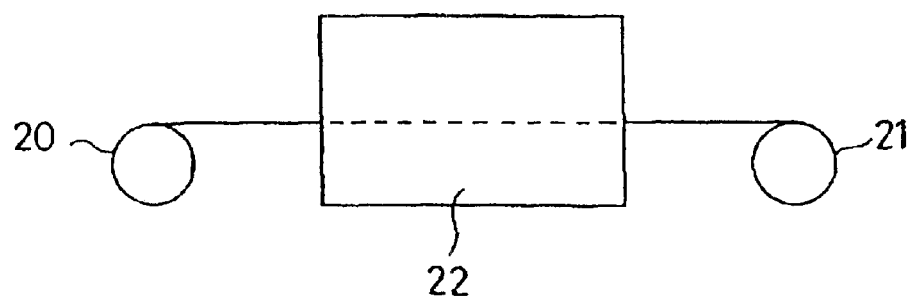
FIG. 4 shows a portion of the manufacturing process of a flocked cloth and is a view for explaining a baking step.

The flocked cloth of this embodiment is produced through the flocking step shown in FIG. 3, the baking step shown in FIG. 4 and the opening processing step (not shown) in order. In the flocking step, a base cloth 12 unreeled from a wound cloth 11 continuously travels in the direction indicated by arrow shown in FIG. 3 and is coated with an adhesive directly under an adhesive tank 13 during its traveling. Piles 16 as a flock material are needle-planted by static electricity at a high-pressure electrostatic field 15 immediately under a flock material hopper 14 and fixed on the base fabric, followed by a drying treatment in a drying chamber 17 using a combustion gas at 100° C. for four minutes and further a brushing step 18. Then, a flocked base cloth 19 is once taken up as a cloth roll 20.

As shown in FIG. 4, the flocked base fabric 19 is coated with an adhesive containing an acrylic acid and a nitrile copolymer emulsion as a principal component and a melamine epoxy crosslinking agent as an auxiliary component by an adhesive recoating apparatus 22 arranged in the process of unreeling from the cloth roll 20 and taking up again as a cloth roll 21.

Using the flocked base cloth 19, a polishing tape having a predetermined width of the present invention is produced through the opening processing step where each of acrylic padding, steaming, opening, washing with water, neutralization, dry heat setting and slit processing treatments are conducted in order.

In the respective steps of the flocked cloth, as the flock material of the embodiment according to the present invention, a dissolution-composition type composite yarn consisting of a nylon component and a dissolution component is used after cutting into pieces having a fiber length within a range from 20 to 120 mm (median: 51 mm) in a non-split state.

The dissolution-composition type composite yarn maintains the non-split state in the flocking step and baking step and a pile portion of a flock material protruding from an adhesive layer is split into a thin-fineness filament for the first time by dissolving to remove a polymer having large dissolution properties in the opening processing step, thus forming a flocked portion. The base portion of the pile portion is embedded in the adhesive layer.

In a conventional flocking processing using a normal flocking technique, it is carried out to make the fiber rigid and upright, provided with good conductivity, and make the surface smooth with the help of flying of piles in the electric field. For these purposes, the flock material is previously subjected to a pre-treatment using a mixed solution of 2–8% of inorganic salts, 0.1–2.0% of a surfactant and an organic silicon. The organic silicon has an effect of satisfactorily separating the fiber.

Figure 5:
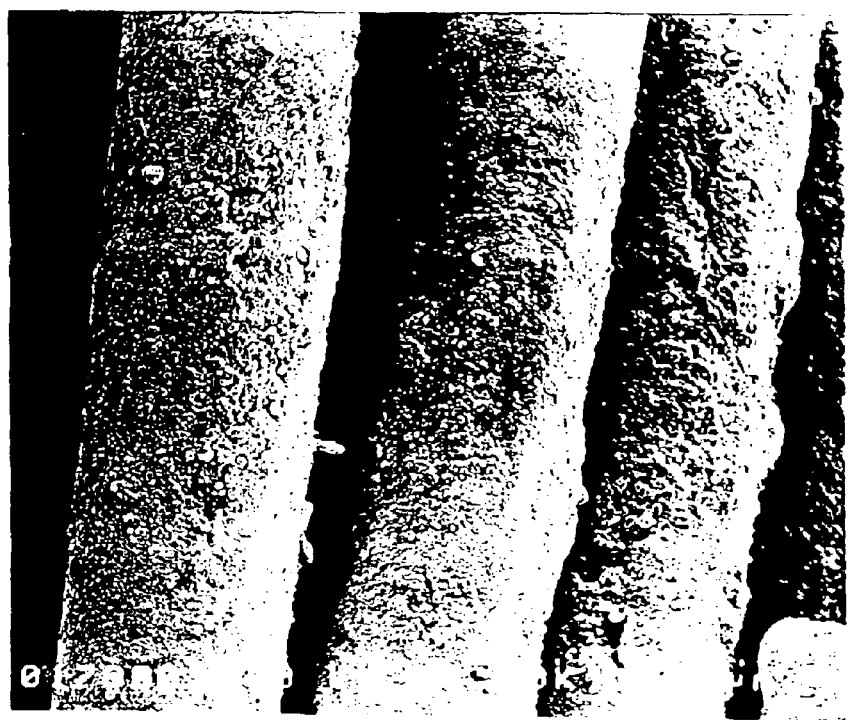
FIG. 5. is a microphotograph showing a pile tip of a conventional flocked cloth.
Figure 6:
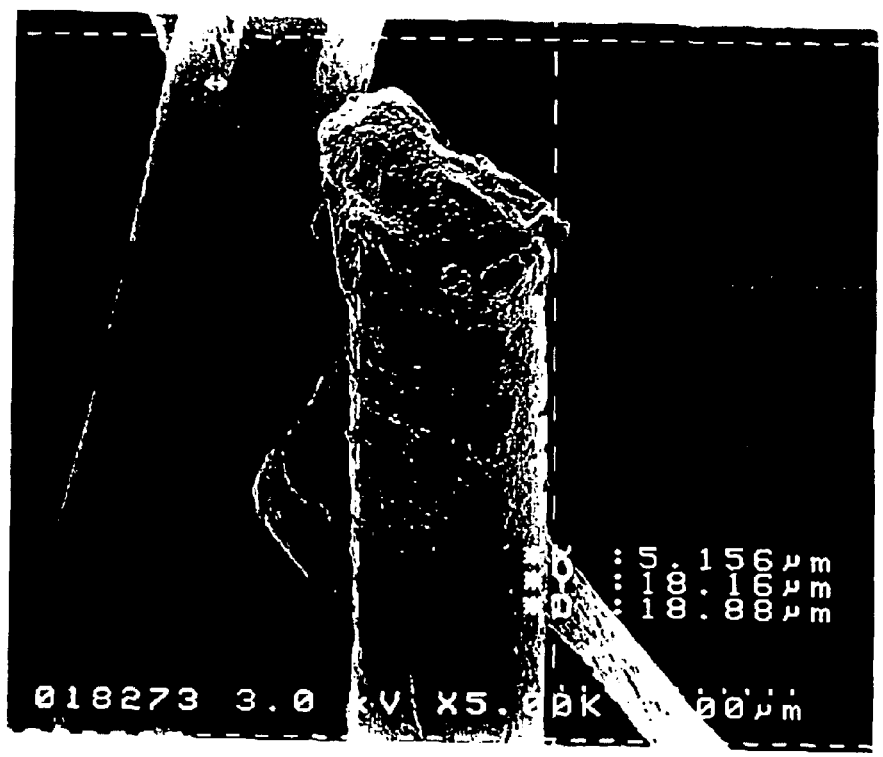
FIG. 6. is a microphotograph showing a pile tip of a flocked cloth according to the present invention.

However, when using such a mixed solution, a very small amount of the mixed solution adheres on the whole pile surface of the final flocked cloth, as shown in FIG. 5, resulting in large defects for the polishing tape. To the contrary, according to the embodiment of the present invention, since a constituent single yarn is split by dissolving to remove a polymer component in a dissolution-composition type composite yarn to form a thin-fineness filament, the pile surface is smooth as shown in FIG. 6 and free from the defects described above.

It is necessary that the pile fineness of the flocked cloth in the embodiment of the present invention, i.e. fineness of the thin-fineness filament, is not more than 0.5 d and 80% or more of piles have a fineness of less than 0.3 d. When the fineness is not less than 0.3 d, the degree of freedom of piles to be arranged perpendicularly to the surface of the base cloth is insufficient and the softness is poor so that the polished disk surface is likely to take deep scratches. With the reduction of the size of abrasive grains (following generation), these features are essential to uniformly trap them.

In the final product, the height of piles protruding from the surface of the base cloth is properly within a range from 0.2 to 1.0 mm. When the height is less than 0.2 mm, the degree of freedom of the pile tip is impaired to cause scatter in flocking density, thus making it impossible to uniformly maintain abrasive grains. On the other hand, when the height exceeds 1.0 mm, there arises a disadvantage that the piles mutally intersect. The pile density (flocking density) is properly within a range from 100 to 200 g/m².

As the base cloth for the flocked cloth, on which piles are directly needle-planted, a twill made of an ester/rayon union yarn has hitherto been used. However, the fabric sometimes causes wrinkles at both salvage portions due to a salvage curling phenomenon of a wound fabric, thereby drastically impairing the quality of the product. In this embodiment, the base fabric is produced by a multifilament made of synthetic fibers and the single yarn of the multifilament is formed of a core-sheath type composite yarn wherein a softening point of a sheath component is 20° C. or more lower than that of a core component, thus completely solving the drawback described above.

Using polyethylene terephthalate (melting point: 255° C., softening point: 240° C.) whose acid component is 100% terephthalic acid, as a core component, and using a polyamide fiber made of nylon or 6 nylon 66 having a softening point, which is 20° C. lower than that of polyethylene terephthalate, as a sheath component, such a core-sheath composite fiber is spun at a core-sheath ratio of 1:1, and then the resulting multifilament is used as warps and wefts to give a plain weave, a still or a satin, which is used as a base fabric. The flocked cloth of this embodiment is obtained by flocking the pile described above on the base fabric.

The polishing tape made of the fabric according to the present invention will be described below. In the polishing tape, a single yarn having the same structure as that of the dissolution-decomposition type composite yarn used in the flocked cloth is used and a multifilament obtained by bundling a plurality of single yarns is used as a weft. Although the dissolution-decomposition type composite yarn has either a petal-shaped section described in Examined Patent Publication (Kokai) No. 6-21397 or a sea-island type section described in Examined Patent Publication (Kokai) No. 62-50594, the fineness of the thin-fineness filament obtained by dissolving to remove a polymer having large dissolution properties in the composite yarn is set to 0.5 d or less, and preferably the fineness of 80% or more of the total thin-fineness filaments is set to 0.3 d or less.

As the warp used in combination with such a weft, a straight yarn of a conventional filament made of nylon 6 or nylon 66, which has a single yarn fineness of not more than 5 d, is used, and a false twist yarn thereof is preferably used.

In the fabric consisting of the warp and weft of this embodiment, TCF must be adjusted within a range from 2,000 to 4,500, TCF referring to the sum total of a warp cover factor and a weft cover factor of the fabric.

In the target polishing tape of the present invention, the tensile strength and tensile elongation are preferably maintained at predetermined values as described above while reducing the thickness to the utmost. When TCF exceeds 4,500, the thickness becomes too large, which is not proper. On the other hand, when TCF is less than 2,000, it becomes difficult to produce a fabric having good durability.

As the texture constituting the fabric, either a plain weave, a still or a satin can be used. Since crossover points are desultorily formed on the surface of the resulting fabric and either warps or wefts float lengthwise on the whole of one surface of the fabric to cover the cloth surface and, moreover, crossover points disappear to smooth the surface, a satin, particularly a satin with wefts floating lengthwise is best suited for use in the polishing tape.

The step of decomposing the dissolution-decomposition type composite yarn constituting a weft is carried out in the finishing step which is carried out after forming into a fabric, and a thin-fineness filament is formed by simultaneously performing dissolution to remove a polymer having large dissolution properties and splitting of the constituent single yarn. The polishing tape made of the fabric can be obtained by the embodiment described above.

Furthermore, the embodiments of the polishing tape made of the nonwoven fabric according to the present invention will be described below. In the polishing tape of the present invention, fibers, which have the same structure as that of the dissolution-decomposition type composite yarn used in the flock material of the flocked cloth and wefts of the fabric, are used as webs, and a predetermined nonwoven fabric is formed by cutting a multifilament thereof into short fibers of 51 mm in length, carding the fibers, laminating web layers with a good balance in warp and weft directions in a cross-lay manner, and spraying ultrahigh-pressure water (about 300 kg/cm$^2$) over the laminate, thereby making a group of short fibers to mutually intersect to give a raw fabric for nonwoven fabric, dissolving a polymer having large dissolution properties in the dissolution-decomposition type composite yarn in a post-processing to remove the polymer, followed by splitting and opening processing of the remaining thin-fineness filament made of nylon 6 or nylon 66.

Accordingly, it is necessary that the fineness of thin-fineness filament constituting the nonwoven fabric is adjusted to 0.5 d or less and 80% of the constituent thin-fineness filament is formed in fineness within a range from 0.03 to 0.3 d. The fiber length is preferably within a range from 20 to 120 mm. The tensile strength and tensile elongation of the final polishing tape are preferably a predetermined values described above. To obtain the above value of the tensile elongation, it is preferred to form a structure wherein heat-fusing fibers are mixed and mesh sheets made of polypropylene are interposed between the nonwoven fabrics. A film is preferably applied to one surface and, in this case, a film made of polyester or polypropylene having a thickness within a range from about 20 to 50 μ is preferably bonded. The thickness of the tape is preferably set within a range from 0.3 to 1.0 mm, while the distance between nozzles is preferably set within a range from 0.2 to 3.0 mm.

Figure 2:
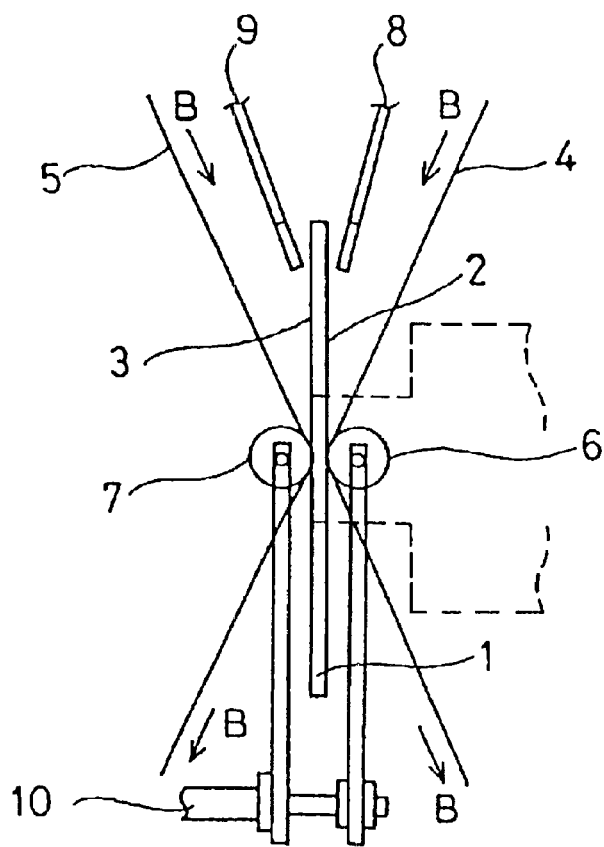
FIG. 2 is a side view showing the service condition of a polishing tape according to the present invention.

Each of the polishing tapes made of the flocked cloth, fabric and nonwoven fabric obtained by the processes shown in the embodiments described above is cut into a continuous tape having a defined width through a finishing process to form a tape winding body, which is then put into practical use as tapes 4, 5 shown in FIG. 1 and FIG. 2.

EXAMPLES

The following Examples further illustrate the present invention in detail.

Example 1

A drawn yarn of a dissolution-decomposition type composite yarn (100 d/50 f) obtained by a conventional step was cut into pieces of 51 mm in length to form a pile material used in Example A. The dissolution-decomposition type composite yarn had a petal-shaped transverse section, wherein one segment arranged at a center and eight segments arranged around the segment are made of nylon 9 and these segments are integrated with a polymer having dissolution properties larger than those of nylon 6. Nine segments described above had almost the same fineness.

Using, as a weft, a union yarn (20 count, English type count) containing 65% polyester cotton and 35% rayon stable cotton, a 2/1 twill was produced at a warp density of 80/inch and a weft density of 45/inch and the resulting twill was used as a base cloth of Example A.

Using the pile material and base cloth, a polishing tape made of a flocked cloth of Example A was produced through the flocking step, baking step and opening processing step shown in FIG. 3 and FIG. 4.

The drawn yarn configuration of the dissolution-splitting type composite yarn was charged to 75 d/50 f from 100 d/50 f and the drawn yarn was flocked by using the same base cloth and step as in Example A to obtain a polishing tape made of a flocked article of Example B.

Using, as a pile material, a nylon fiber consisting of a constituent single yarn of 16 μm in diameter obtained from 170DMF (sea-island type composite fiber), the pile material was flocked by using the same base cloth and step as in Example A to obtain a polishing tape made of a flocked article of Comparative Example C.

Major constituent features of the three kinds of polishing tape described above as well as results of use as tapes 4, 5 in the service aspect shown in FIG. 1 and FIG. 2 are shown in Table 1.

TABLE 1

| | Items | Example A | Example B | Comp. Example A |
|---|---|---|---|---|
| Con-stituent features | Pile fiber diameter (μm) | 5 | 4.3 | 16 |
| | Pile material | Nylon 6 | Nylon 6 | Nylon 6 |
| | Pile height (mm) | 0.5 | 0.5 | 0.5 |
| | Kind of raw fiber yarn (d/f) | 100/50 BKR | 75/50 BKR | 170 DMF |
| | Flocking density (g/m$^2$) | 150 | 200 | 100 |
| | Opening processing step | Continuous method | Continuous method | Continuous method |
| Results of use | Surface roughness of substrate after polishing (Ra) Å | 13.3 | 11.4 | 14.5 |
| | Processing speed (nm) | 115 | 104 | 88 |

Example 2

Using a false twist yarn of a dissolution-splitting type composite yarn of 100 d/50 f used in Example A as a weft and using a twist yarn of a polyester filament of 75 d/36 f as a warp, a fabric with 8-satin per one surface was produced to obtain a polishing tape made of a fabric of Example C.

Using the same false twist yarn as in Example C as a weft and using a non-twist yarn of a polyester filament of 60 d/48 f as a warp, a fabric with 8-satin per one surface was produced to obtain a polishing tape made of a fabric of Example D.

Using a polyester multifilament having a fineness of about 0.06 d of thin-fineness filaments having a total denier of 100 d and a single yarn fineness of 4 d made of sea-island type composite fibers as a weft and using a polyester multifilament of 75 d/18 f as a warp, a fabric with 5-satin per one surface was produced to obtain a polishing tape made of a fabric of Comparative Example B.

Major constituent features of the three kinds of polishing tape described above as well as results of use as tapes 4, 5 in the service aspect shown in FIG. 1 and FIG. 2 are shown in Table 2.

TABLE 2

| | Items | Example C | Example D | Comp. Example B |
|---|---|---|---|---|
| Constituent features | Fabric texture | 8-satin per one surface | 8-satin per one surface | 5-satin per one surface |
| | Warp polymer | Polyester | Polyester | Polyester |
| | Processing state of warp | Raw silk 200 T/M | Non-twist yarn of raw silk | Non-twist yarn of raw silk |
| | Kind of warp (d/f) | 75/36 | 60/48 (high shrink yarn) | 75/18 |
| | Warp fiber diameter (μm) | 5 | 5 | 5 |
| | Weft polymer | Nylon 6 | Nylon 6 | Polyester |
| | Processing state of weft | False twist yarn | False twist yarn | Raw silk |
| | Kind of weft (d/f) | 100/50 BKR | 100/50 BKR | 140 D-MF |
| | Number of warps per inch | 108 | 122 | 137 |
| | Number of wefts per inch | 160 | 168 | 130 |
| | Cover factor | 3,198 | 3,321 | 2,724 |
| Results of use | Surface roughness of substrate after polishing (Ra) Å | 11.2 | 10.0 | 13.7 |
| | Processing speed (nm) | 88 | 100 | 67 |

Example 3

Using the material used in Example A as a web material for nonwoven fabric of Example E and using the pile material used in Comparative Example A as a web material of Comparative Example C, polishing tapes made of a nonwoven fabric having a tape thickness of 0.6 mm of Example E and Comparative Example C were separately produced through the above manufacturing process of the nonwoven fabric. Major constituent features of the two kinds of polishing tape described above as well as results of use as tapes 4, 5 in the service aspect shown in FIG. 1 and FIG. 2 are shown in Table 3.

TABLE 3

| | Items | Example E | Comp. Example C |
|---|---|---|---|
| Constituent features | Web fiber diameter (μm) | 5 | 16 |
| | Web material | Nylon 6 | Nylon 6 |
| | Kind of raw fiber yarn (d/f) | 100/50 BKR | 170 DMF |
| | Weight (g/m²) | 130 | 130 |
| Results of use | Surface roughness of substrate after polishing (Ra) Å | 15 | 16 |
| | Processing speed (nm) | 70 | 65 |

As is apparent from Table 1, Table 2 and Table 3, the polishing tapes of Examples according to the present invention are superior in surface roughness and processing speed to that of the Comparative Examples. As used herein, the term "surface roughness" refers to surface roughness defined in JIS B 1061.

INDUSTRIAL APPLICABILITY

According to the polishing tape of the present invention, since the surface to be contacted with a substrate to be polished is formed of a thin-fineness filament made of nylon 6 or nylon 66 having a fineness of not more than 0.5 d, preferably less than 0.3 d, which is obtained by splitting a dissolution-decomposition type composite yarn in any of the flocked cloth, fabric and nonwoven fabric, the polishing tape is superior in compatibility with diamond microparticles as an abrasive and has an effect of absorbing a grain size balance of fine powders. For example, even when fine powders having a large grain size are suddenly incorporated, the substrate does not take large scratches. Particularly, when using the flocked cloth as a fiber structure, since the base material of the present invention is a fabric, this effect becomes further remarkable because the base material itself has an elastic force.

As described in the opening paragraph, with the increase in the requirement of information density on the substrate, the fineness of constituent fibers of the polishing tape must be reduced. In the present invention, the fineness of constituent fibers can be reduced comparatively easily because thin fineness is attained by splitting the dissolution-decomposition type composite yarn. Therefore, the present invention has an advantage capable of sufficiently coping with the requirement of an improvement in information density by the use of a raw yarn having a fineness thinner than that described above (e.g. not more than 0.15 d, and preferably not more than 0.1 d) as well as size reduction of the abrasive (e.g. diamond microparticles, etc.).

What is claimed is:

1. A polishing tape for polishing the surface of a substrate of a magnetic recording medium, said polishing tape being made of a flocked cloth comprising a substrate and a flock material formed on said substrate, said flocked cloth having a tensile strength in a longitudinal direction as measured by the method A defined in JIS L 1096-1990 of not less than 25 kgf/50 mm and a tensile elongation of not more than 5%/5 kg/50 m, a single yarn of a dissolution-decomposition type composite fiber consisting of a nylon component and a dissolving component is used as said flock material and a thin-fineness filament obtained by splitting said single yarn is used as a pile, said pile is formed in pile height within a range from 0.2 to 1.0 mm and pile density within a range from 100 to 200 g/m² and 80% or more of said pile is formed in a fineness of less than 0.3 d.

2. A polishing tape for polishing the surface of a substrate of a magnetic recording medium, said polishing tape being made of a satin fabric, the sum total of a warp cover factor and a weft cover factor of said satin fabric being within a range from 2,000 to 4,500, a multifilament made of nylon or polyester fibers having a single yarn fineness of not more than 5 d is used as a warp and a multifilament, whose constituent single yarn is formed into a dissolution-decomposition type composite fiber consisting of a nylon component and a dissolving component, is used as a weft, and 80% or more of a thin-fineness filament obtained by splitting a single yarn of said dissolution-decomposition type composite fiber is formed in fineness of less than 0.3 d.

* * * * *